May 15, 1951 C. S. LYNCH 2,553,100
FILM VIEWER FLASHLIGHT ATTACHMENT
Filed April 21, 1948
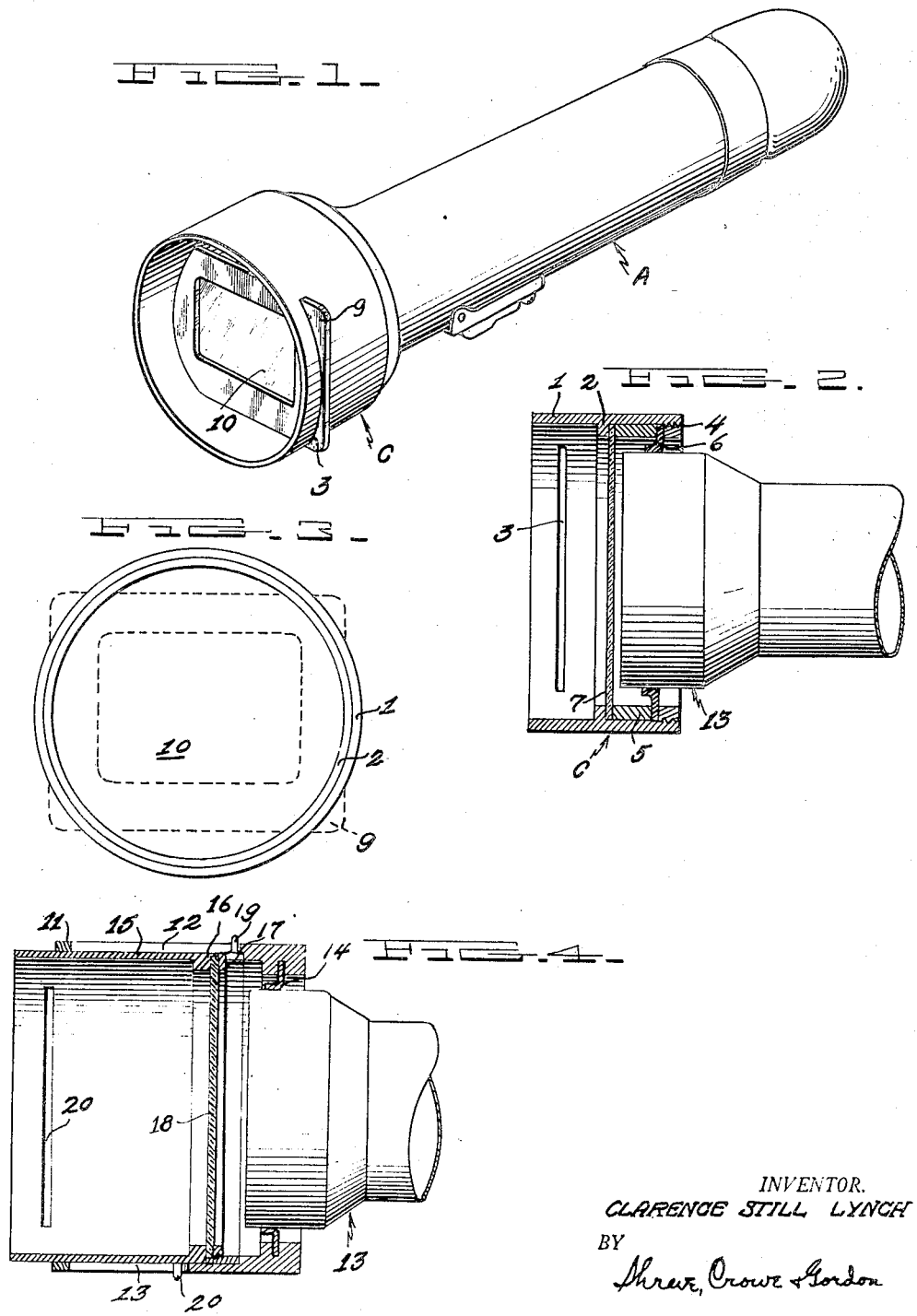
INVENTOR.
CLARENCE STILL LYNCH
BY
Shrev, Crowe & Gordon
Attorneys Patented May 15, 1951

2,553,100

UNITED STATES PATENT OFFICE 2,553,100

FILM VIEWER FLASHLIGHT ATTACHMENT

Clarence Still Lynch, New Hyde Park, N. Y.

Application April 21, 1948, Serial No. 22,382

1 Claim. (Cl. 40—130)

The present invention relates to an attachment for flashlights which will permit an easy and convenient viewing of objects such as, for example, pictures or transparencies, or photographs on small films, or the like.

One of the objects of the present invention is to provide a simple and readily attachable accessory for a flashlight which permits a convenient viewing of transparent objects, such as photographs on small sizes of photographic films, or the like, which enables the object to be rendered distinctly visible through improved illumination thereof.

A further object of the invention is to provide an improved construction of a viewing device adapted to be attached to a conventional or standard flashlight, the device being adapted to receive a holder for the film or other object on which the portions to be viewed are carried.

A still further object of the invention is to provide a viewing device of the above-indicated character, which is adapted to slidably receive a holder of the above-described character, and which enables the holder to be slipped readily into and away from viewing position.

A still further object of the invention is to provide a viewing device of the above indicated character which includes means for diffusing uniformly the illuminating light onto the object to be viewed.

A still further object of the invention is to provide a viewing attachment for conventional flashlights which may be applied easily and removed readily from the flashlight, the attachment being a unit which is adapted to be slipped over the illuminating end of the flashlight and yieldably held in place.

A still further object of this invention is to provide a viewing attachment for a conventional flashlight which enables the holder for the objects being viewed, together with the light-diffusing means to be adjusted relative to the source of light in the flashlight.

Further objects of the invention will become apparent from the following description, and the features of novelty will be pointed out in particularity in the appended claim.

The invention will be understood more readily by reference to the accompanying drawings, in which:

Fig. 1 is a perspective view of a conventional flashlight having a form of the improved viewing device attached thereto with the viewing slide mounted therein.

Fig. 2 is a vertical longitudinal sectional view of the viewing device shown in Fig. 1, the view being taken on the longitudinal vertical axis of the viewing device.

Fig. 3 is a front end elevation of the attachment of Fig. 1.

Fig. 4 is a view similar to Fig. 2, but showing a modification.

Referring to the drawings in greater particularity, the reference character A represents a conventional flashlight, on the illuminating end B of which is attached a viewing attachment C, which is representative of the construction of the present invention. The device comprises a sleeve or housing 1, having an internal annular flange 2, and having diametrically opposed slots 3. The housing 1 is threaded internally as indicated at 4 for receiving a threaded liner 5, which carries a flexible light proof gasket 6 adapted to slip over the end B of the flashlight and grippingly hold said attachment C on the flashlight. The liner 5 and annular flange 2 retain between them a light diffusing element 7, which preferably is made of glass having ground or etched surfaces to produce a uniform diffusion of light coming from the illuminating flashlight A. The liner 5 and flexible gasket 6 have an opening sufficiently large to receive the end of the flashlight A, the gasket 6 being provided with an annulus having a diameter somewhat less than the outside diameter of the flashlight.

The housing 1 is provided with diametrically opposed slots 3, which receive a slide holder 9 having an aperture 10 therein for exposure of the objects to be viewed to the diffused light from the diffuser 7, the aperture 10 being of whatever size may be required for viewing the objects mounted in the holder. Thus, for example, the aperture 10 may be of a size to expose a sixteen m. m. film or a thirty-five m. m. film, on which have been developed photographs which are desired to be viewed. The slide holder conveniently may be made by cutting registering apertures in corresponding sheets of cardboard, which are glued together or otherwise joined with the film or the like interposed between them.

Fig. 4 shows a modified construction, in which a housing 11 is provided with top and bottom slots 12 and 13, and carries within its attaching end a yieldable, resilient, or flexible gasket 14, similar to gasket 6, for attachment of the device to the flashlight. A liner or adjustable sleeve 15 telescopically mounted in said housing 11, is provided with an annular internal flange 16 and a threaded annular retaining ring member 17, which hold the light diffuser 18 between them, Operating projections 19 and 20 extend from the liner 15 through the slots 12 and 13 for enabling the liner to be slidably moved back and forth in the housing 1 for effecting adjustment of the slide holder mounted in slot 20 and the diffuser 18 relative to the end of the flashlight and the light bulb.

It will be apparent from the foregoing that the invention provides a simple means for illuminating and viewing objects mounted on transparent surfaces, such as, for example, pictures developed on photographic film, advertising indicia for display purposes, or the like where different degrees of light transmission cause the objects to be viewed to be prominently or clearly visible. Also, it will be apparent that various changes in details of construction may be embodied in the device without departing from the spirit of the invention, as will become apparent to one skilled in the art; and accordingly, it will be understood that it is intended and desired to embrace within the scope of the invention such modifications and changes as may be necessary to adapt it to such varying conditions and uses as are defined by the appended claim.

What is claimed is:

A viewing device for attachment to a flashlight, which comprises a housing, a liner slidably mounted in the housing, the housing having an aperture at one end sufficiently large to receive the illuminating end of a flashlight, a resilient gasket mounted in the housing for holding said housing on the flashlight, the liner having oppositely disposed slots for receiving and holding an object to be viewed, a light-diffusing member mounted in the liner, oppositely disposed longitudinally extending slots in the housing, and operating projections secured to the liner and extending through said slots in the housing for enabling adjustment of the liner in the housing with corresponding adjustment of the object to be viewed and the light-diffusing member, said light-diffusing member being adapted to uniformly diffuse light from the flashlight over the object to be viewed.

CLARENCE STILL LYNCH.

REFERENCES CITED

The following references are of record in the file of this patent:

UNITED STATES PATENTS

| Number | Name | Date |
|---|---|---|
| 778,891 | Rausch | Jan. 3, 1905 |
| 1,291,710 | Arter | Jan. 21, 1919 |
| 1,516,718 | Daily | Nov. 25, 1924 |
| 1,600,067 | Retze | Sept. 14, 1926 |
| 1,649,638 | Wood | Nov. 15, 1927 |
| 1,729,660 | Farmer, Jr. | Oct. 1, 1929 |
| 2,090,086 | Weiner | Aug. 17, 1937 |
| 2,092,672 | Hyatt | Sept. 7, 1937 |
| 2,215,829 | Evans | Sept. 24, 1940 |